US006999973B1

(12) United States Patent  
Murray

(10) Patent No.: US 6,999,973 B1  
(45) Date of Patent: Feb. 14, 2006

(54) INFORMATION GATHERING FACILITY EMPLOYING DICTIONARY FILE CONTAINING MULTIPLE INQUIRES

(75) Inventor: Douglas George Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,909

(22) Filed: Nov. 18, 1999

(51) Int. Cl.  
*G06F 7/00* (2006.01)

(52) U.S. Cl. .................................. 707/104.1

(58) Field of Classification Search ......... 707/1–104.1; 711/1, 210, 207  
See application file for complete search history.

(56) References Cited

U.S. PATENT DOCUMENTS

| | | | | |
|---|---|---|---|---|
| 4,742,467 A * | 5/1988 | Messerich et al. | ......... | 717/114 |
| 5,005,122 A | 4/1991 | Griffin et al. | ............... | 364/200 |
| 5,315,703 A * | 5/1994 | Matheny et al. | ........... | 345/700 |
| 5,367,633 A * | 11/1994 | Matheny et al. | ........... | 345/764 |
| 5,517,606 A * | 5/1996 | Matheny et al. | ........... | 345/810 |
| 5,530,864 A * | 6/1996 | Matheny et al. | ........... | 709/315 |
| 5,553,282 A | 9/1996 | Parrish et al. | .............. | 395/600 |
| 5,619,716 A | 4/1997 | Nonaka et al. | ............ | 395/800 |
| 5,621,729 A * | 4/1997 | Johnson et al. | ............ | 370/259 |
| 5,640,550 A * | 6/1997 | Coker | .......................... | 707/4 |
| 5,659,735 A | 8/1997 | Parrish et al. | .............. | 395/610 |
| 5,668,992 A | 9/1997 | Hammer et al. | ........... | 395/651 |
| 5,752,042 A | 5/1998 | Cole et al. | ................... | 395/712 |
| 5,752,245 A | 5/1998 | Parrish et al. | ................ | 707/10 |
| 5,784,552 A * | 7/1998 | Bishop et al. | ................ | 714/38 |
| 5,835,911 A | 11/1998 | Nakagawa et al. | ......... | 707/203 |
| 5,862,325 A * | 1/1999 | Reed et al. | .................. | 709/201 |
| 5,909,689 A | 6/1999 | Van Ryzin | ................... | 707/203 |
| 5,915,112 A | 6/1999 | Boutcher | ..................... | 395/684 |
| 5,923,885 A | 7/1999 | Johnson et al. | ............ | 395/712 |
| 6,088,717 A * | 7/2000 | Reed et al. | .................. | 709/201 |
| 6,198,480 B1 * | 3/2001 | Cotugno et al. | ........... | 715/866 |
| 6,219,719 B1 * | 4/2001 | Graf | ............................. | 710/1 |
| 6,259,446 B1 * | 7/2001 | Matheny et al. | ........... | 345/764 |
| 6,338,149 B1 * | 1/2002 | Ciccone et al. | ............... | 714/38 |
| 6,356,892 B1 * | 3/2002 | Corn et al. | .................... | 707/3 |
| 6,356,936 B1 * | 3/2002 | Donoho et al. | ............ | 709/206 |
| 6,460,043 B1 * | 10/2002 | Tabbara et al. | ............ | 707/100 |

OTHER PUBLICATIONS

IBM Technical Disclosure Bulletin, vol. 38, No. 08, Aug. 1995, "Versional Equalizer Program for Server/Client", pp. 575-576.

* cited by examiner

*Primary Examiner*—Luke S Wassum  
*Assistant Examiner*—Linh Black  
(74) *Attorney, Agent, or Firm*—William E. Schiesser; Kevin P. Radigan, Esq.; Heslin Rothenberg Farley & Mesiti, P.C.

(57) ABSTRACT

An information gathering facility is provided which includes a dictionary file data structure having a plurality of inquiries for ascertaining state information on a computer system. The plurality of inquiries are organized into at least one subject group having multiple records of inquiry. These multiple records of inquiry are processed such that if a condition of one record is satisfied then processing terminates for the group, otherwise processing proceeds to a next record and continues until a condition of one of the records of the group is satisfied or until all records have been processed. One or more of the plurality of inquiries comprise instructions which output a result when a condition of the instruction is satisfied. Thus, the state information to be output is defined by the results contained within the instructions of the dictionary file itself.

67 Claims, 8 Drawing Sheets

POSSIBLE INQUIRY TYPES
- FILE
  - ✓ CHECK FOR EXISTENCE OF A FILE OF A CERTAIN DATE, TIME AND SIZE.
  - ✓ CAN RETURN FILE INFORMATION.
- INI FILE
  - ✓ CHECK FOR A CERTAIN APPLICATION, VARIABLE AND VALUE.
  - ✓ CAN RETURN A CERTAIN VALUE OR ALL VARIABLES AND VALUES.
- ASCII FILE
  - ✓ CHECK FOR A CERTAIN CHARACTER STRING IN A FILE.
  - ✓ CAN RETURN INFORMATION ON THE LINE WITH THE CHARACTER STRING.
- REGISTRY
  - ✓ CHECK FOR A CERTAIN REGISTRY TREE AND VALUE.
  - ✓ CAN RETURN VALUE OR ALL VALUES IN SUB TREES.
- EXTERNAL PROCESS USING INI OUTPUT
  - ✓ EXECUTE AN EXTERNAL PROCESS AND DO AN INI FILE INQUIRY ON THE RESULTS.
- EXTERNAL PROCESS USING ASCII OUTPUT
  - ✓ EXECUTE AN EXTERNAL PROCESS AND DO AN ASCII FILE INQUIRY ON THE RESULTS.
- EXTERNAL PROCESS USING REGISTRY
  - ✓ EXECUTE AN EXTERNAL PROCESS AND DO A REGISTRY INQUIRY ON THE RESULTS.
- MULTIPLE
  - ✓ DO A COMBINATION OF THE OTHER INQUIRES WHERE ALL MUST SUCCEED.

fig. 2

EXAMPLE DICTIONARY FILE

```
[IP ADDRESS]
;IPCONFIG;%APPID%=%VALUE%;IP ADDRESS;*
[HOSTNAME]
;IPCONFIG;%APPID%=%VALUE%;HOST NAME;*
[NAMESERVERS]
;IPCONFIG;%APPID%=%VALUE%;DNS SERVERS;*
[DHCP]
;IPCONFIG;DHCP IS ENABLED;DHCP ENABLED;YES
;IPCONFIG;DHCP IS NOT ENABLED;DHCP ENABLED;NO
[GATEWAY]
;IPCONFIG;%APPID%=%VALUE%;DEFAULT GATEWAY;*
[APPSW01]
;FILE;APPSW01=NOTES;4.6.1;NOTES.EXE;9/15/1997;19:15;232448
;FILE;APPSW01=NOTES;UNKNOWN %FIELD% %DATE% %TIME% %SIZE%;NOTES.EXE
[NOTESID]
;INI;NOTESID=%VALUE%;NOTES.INI;NOTES:LOCATION;*;NOTES.EXE
``` fig. 8

INFORMATION GATHERING FACILITY EMPLOYING DICTIONARY FILE CONTAINING MULTIPLE INQUIRES

CROSS-REFERENCE TO RELATED APPLICATION

This application contains subject matter which is related to the subject matter of the following application, which is assigned to the same Assignee as this application and which is hereby incorporated herein by reference in its entirety:

"Information Gathering Facility Employing Dictionary File Containing Inquiry Invoking An External Process," by Douglas G. Murray, now U.S. Pat. No. 6,427,144 B1, issued July 30, 2002.

TECHNICAL FIELD

The present invention relates in general to information processing within a computer system, and more particularly, to an information gathering facility, for example, for a network of computer systems for use in ascertaining updated state information on one or more computer system within the network. Still more particularly, the invention relates to a configuration of a dictionary file data structure employed in ascertaining state information on one or more computer systems of a network and to a technique for gathering such information using the dictionary file.

BACKGROUND OF THE INVENTION

Computer networks provide a number of advantages over standalone systems. In a network, each computer is a node which communicates with other nodes over one or more links. Nodes may be provided which store and manage databases or other data files on mass storage devices, or which manage printers or links to public telecommunication networks, etc.

As networks become larger, and more computers, input/output devices and other machines are connected together, management of the network becomes more and more difficult. To alleviate data transfer limitations when connecting many nodes to a single network, networks are often divided into a smaller number of nodes, essentially creating separate networks which are then interconnected by means of bridges or gateways to allow a node on one sub-network to communicate with a node on another sub-network. This alleviates the data transfer limitations of networks, but does not alleviate management problems.

One problem associated with management of a computer system is managing software on the different computing nodes. Software management can include a number of functions, such as verifying that a computing node has a particular type of file, a particular version of the file, and possibly, ascertaining contents of the file. Keeping track of software distribution and use can be important for licensing purposes, as well as for basic functioning of the network. In the past, when computer systems were a single large, multiuser system, a system manager performed these functions. With the advent of single user systems, such as personal computers and workstations, the users have essentially become the system manager, requiring them to perform these system management tasks individually.

A need thus exists in the art for an enhanced, automated information gathering facility which allows state data, such as file existence and file configuration information, for one or more nodes to be maintained up-to-date in a control information repository of the computer system network.

DISCLOSURE OF THE INVENTION

Briefly summarized, the invention comprises in one aspect a method for gathering information on a state of a computer system. The method includes: providing a dictionary file having a plurality of inquiries for ascertaining state information on the computer system, the plurality of inquiries being organized into at least one subject group, each subject group being directed to a different piece of the state information, at least one group of the at least one subject group having multiple records of inquiry; and processing at least one inquiry of the plurality of inquiries of the dictionary file to accumulate the state information, the processing including for each group of the at least one group having multiple records of inquiry, processing a record of the multiple records of inquiry, and if a condition of the record is satisfied then terminating processing of the group, otherwise processing a next record of the multiple records of inquiry and continuing until a condition of one record of the multiple records of inquiry is satisfied or until all records of the multiple records of inquiry of the group have been processed.

In another aspect, a method is provided for gathering information on a state of a computer system which includes: providing a dictionary file having a plurality of inquiries for ascertaining state information on the computer system, at least one inquiry of the plurality of inquiries includes an instruction having a result which is output when a condition of the instruction is satisfied; and processing the at least one inquiry of the plurality of inquiries of the dictionary file to accumulate the state information, the processing including for each instruction outputting the result of the instruction from the dictionary file when the condition of the instruction is satisfied, wherein the state information on the computer system includes outputted results from satisfaction of the at least one instruction.

Systems and program storage devices corresponding to the above-summarized methods, as well as data structures encompassing the dictionary files employed thereby, are also described and claimed herein.

To restate, presented herein is an information gathering facility which can reside at a central location within a network of computer systems and be read from the central location by the individual computer systems when state information is to be derived. Thus, there is the ability to change one or more inquiries at the central location without making changes at all computer systems of the network. In accordance with the principles of the present invention, there is also an ability to design and implement inquiries of complicated machine configurations without programming, i.e., creating an executable of the file. Further, the format of the inquiry results, that is the state information returned, can be defined in the dictionary file itself, i.e., each instruction or line of inquiry in the dictionary file can possess a condition which if satisfied outputs a result and the cumulative results comprise the state information. This feature can be employed by other processes to query a machine and have the response formatted in a way that the process needs.

By providing multiple inquiries within a group, searching is possible for one or more of several versions of an application installed on a workstation in the network. When an inquiry finds the desired version on a workstation, the remaining inquiries are omitted. As new versions of an application become available, a new inquiry is simply added to the group that is looking for that application. This leaves intact all the inquiries that looked for the 'backlevel' versions. Code reuse is thus encouraged since other applications can use this tool to gather workstation information instead of including separate logic to do their inquiry.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 2 depicts an example of possible types of inquiry which could be employed in a directory file in accordance with the principles of the present invention;

FIG. 8 is an example of a dictionary file data structure implemented in accordance with the principles of the present invention.

BEST MODE FOR CARRYING OUT THE INVENTION

Generally stated, provided herein is an information gathering facility which employs a dictionary file having an unique data structure. Specifically, the dictionary file has a plurality of inquiries for ascertaining state information on a computer system within a network of computers. The plurality of inquiries are organized into one or more subject groups. One or more of the subject groups contain multiple records or lines of inquiry. The information gathering technique employs this dictionary file by processing the inquiries of the subject groups to derive information on the state of the computer system. When multiple records or lines of inquiry exist within a given group, processing terminates with a first record of inquiry which has a condition that is satisfied by the computer system. One or more of the plurality of inquiries within the dictionary file are referred to herein as "instructions" and comprise inquiries with conditions that if satisfied cause the outputting of a result which is to be added to a file being constructed with the state information on the computer system. This feature allows programming (from the dictionary file) of the result to be output upon satisfaction of an inquiry contained within the dictionary file. Thus, the form of the information returned as the state information is dictated from the dictionary file itself. In one embodiment, the dictionary file comprises an ASCII file which is maintained at a central location within a computing network, and which is called by an inquiry tool (i.e., routine) resident on the computer system to be examined.

Figure 1:
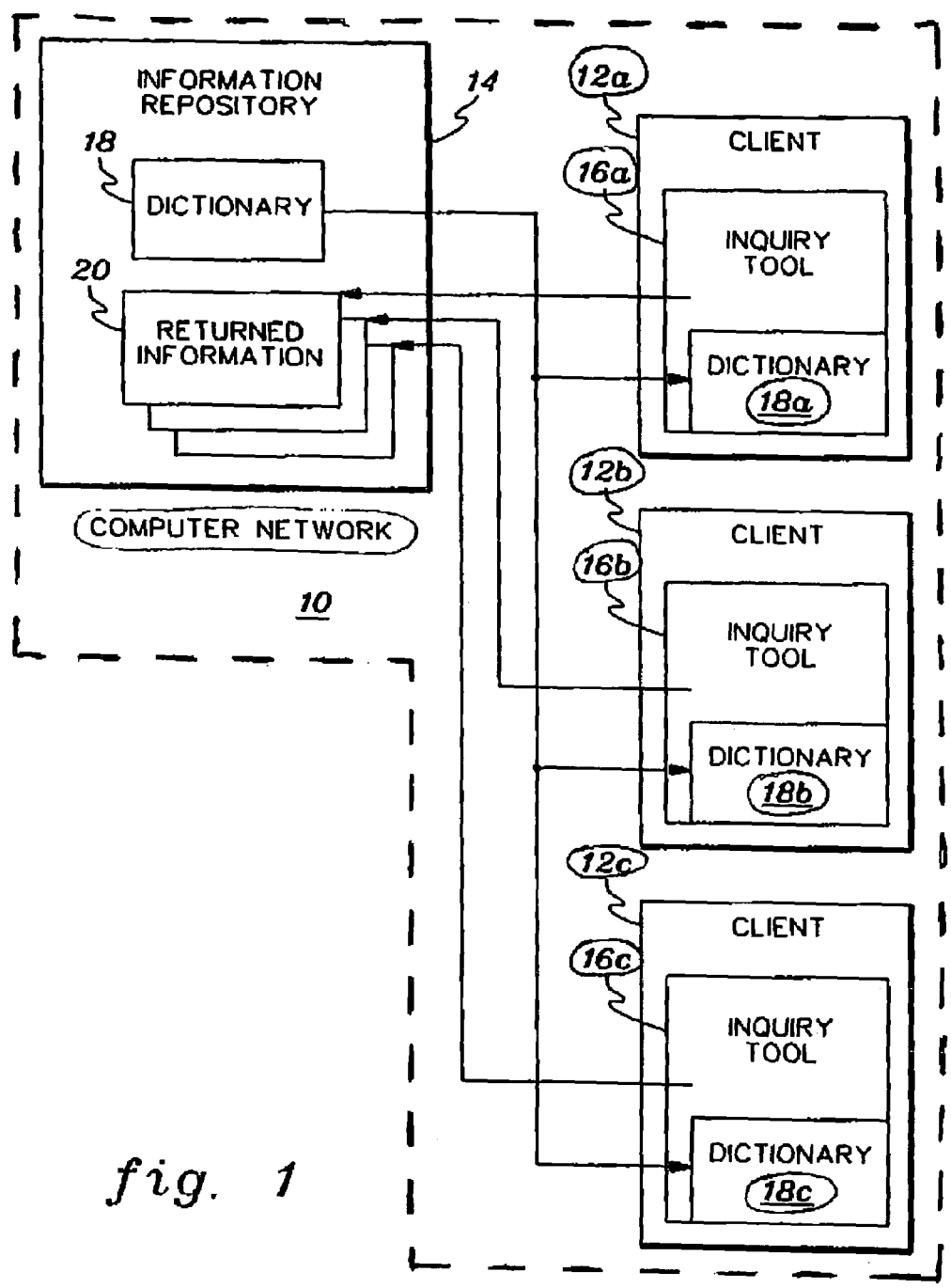
FIG. 1 depicts a computer system network implementing an information gathering facility in accordance with the principles of the present invention.

FIG. 1 depicts one embodiment of a computer network, generally denoted 10, which includes multiple computing systems such as client workstations 12a, 12b, 12c coupled to a server 14. As shown, server 14 functions as an information repository in accordance with the principles of the present invention. Each client workstation 12a, 12b, 12c includes an inquiry tool 16a, 16b, 16c and in this example a copy 18a, 18b, 18c of the dictionary file 18 read from information repository 14. Inquiry tool 16a, 16b, 16c includes the control file which tells, for example, the respective client 12a, 12b, 12c when to update its corresponding state information, where to go to obtain the dictionary file and where to return the state information 20. The inquiry tool is an application that is installed on a workstation that is used to gather information from the workstation. Once operational, the tool will gather the information when executed by the end user optionally on a periodic schedule. Installation of this tool could be lone at any time, but is typically clone prior to a user receiving the workstation for use.

In this embodiment, the returned information 20 is stored at database 20 of information repository 14 of network 10. Preferably, the dictionary file copy at client 12a, 12b, 12c is updated each time inquiry tool 16a, 16b, 16c initiates processing to update the client state information. Note that as used herein the "state of the computer system" and "state information" refer to, for example, whether a program or file exists on the client, the version or level of the program or file, or to a variable or value from an application residing on the client or resulting from execution of an external process by the client as described in greater detail in the above-incorporated, co-filed application.

The information gathering facility of the present invention can be employed with many types of computer system environments and many types of computer systems. For instance, the computer environment might include an RS/6000 computer system running an AIX Operating System (RS/6000 and AIX are offered by International Business Machines Corporation). Alternatively, the computer environment could include a UNIX workstation running a UNIX-based operating system. Instead of a single system, the computing environment could comprise a network of computer systems such as depicted in FIG. 1 wherein each computer system could be a UNIX or AIX workstation and the units are coupled to one another via a TCP/IP connection. Each unit might include, for example, a central processing unit, memory and one or more input/output devices which are well-known in the art. Again, the information gathering facility of the present invention can be incorporated and used with any type of computing unit, computer, processor, node, system, workstation and/or environment without departing from the spirit of the present invention. As another example, each computer system might comprise a PS/2 computer offered by International Business Machines Corporation, or one or more of the units may be based upon the Enterprise Systems Architecture offered by International Business Machines Corporation. Additionally, connection between the computer systems need not be TCP/IP. It can be any type of wire connection, token ring or network connection, to name just a few examples.

FIG. 2 depicts one example of several possible inquiry types which can be employed by a dictionary file constructed in accordance with the principles of the present invention. These inquiry types include: a file inquiry with checks for existence of a file of a certain date, time and/or size, and which can return file information; an INI file inquiry which checks for a certain application, variable and/or value, and which can return a certain value or all variables and values; an ASCII file inquiry which checks for a certain character string in a file, and which can return information on a line within the character string; a registry inquiry which checks for a certain registry tree and value, and which can return a value or all values within a tree or sub-tree; an external process inquiry using an INI output which executes an external process and performs an INI file inquiry on the results; an external process inquiry using an ASCII output, which executes an external process and performs an ASCII file inquiry on the results; an external process inquiry using a registry which executes an external process and does a registry inquiry on the result; and a multiple inquiry which can comprise a combination of selected inquiry types wherein all inquiries must succeed.

By way of example, if application APP1 has an INI file entry of Version=1.0 for version 1.0 but for some reason the INI file is not used at all for version 2.0 but instead a new file APP1.DAT is used, the following would detect the installed version:

1. Check for APP1.DAT file on the system, if found version 2.0 is installed.
2. Check the INI file for Version=1.0 line, if found version 1.0 is installed.
3. Check for APP1.EXE to see if any version is installed.

As noted, one feature of an information gathering facility or Client Information Gathering Facility (CIGF) in accordance with the principles of the present invention is the dictionary file. This file is used to determine what the state of the computer system is and what information is to be returned to the server to be placed into the data repository. Within the dictionary file there are sections or groups of inquiries. Each group has one or more lines or records of inquiries that instruct CIGF how to gather the desired state information for that particular subject group. This information can be, for example, a version or setting data as supported by the options described below. Within the subject groups, any or all lines of inquiry may be used to obtain a result. In one example, a "Notes" grouping may have two lines which when processed determine the output, if any.

[Notes]
;file;Notes:V4.5;notes.exe;3/11/1997;231936
;file;Notes:Unknown fileid% %date% %time% %size%; notes.exe [next app]
;file;%appid%:V6;napp.exe;6/22/1996

First the file notes.exe is searched for in the file system. If it is found and is dated Mar. 11, 1997 and its size is 231936 then the string Notes:V4.5 is output. Otherwise, the process continues for each line under the group until one of the lines is successful or there are no more lines for the group. In this example, if the Notes.exe file could not be found according to the first line, then the second line is processed. Since there is no date, time or size specified for the second line then it will succeed if the Notes.exe file exists anywhere on the system. The output line will contain the full path where it was found and the date, time and size of the file.

There are several options that are available to be used on the lines for each group. The first character on the line can be used as the delimiter for each of the fields used when an option is used to return information.

The following is a description of certain possible options and the syntax of the lines that implement them. Each option below is available on various operating systems, such as the OS/2 Operating System offered by International Business Machines Corp.

Check for Existence of a File

This option can be used to check for the existence of a file to determine the version of software that is installed. The file option can be used to check for the existence of a set of files and return a version statement if the files are found.

Syntax:
;file;output;fileid1;date1;time1;size1; . . . ;fileidn;daten;timen;sizen Output This is the output that will be placed in the output file if the files are found. There are several variables that will be substituted into this string before it is returned.

%appid%
The current group or application id.

%del%
The input field delimiter.

%fileid%
The full path of the last file being searched for.

%date%
The date of the last file being searched for.

%time%
The time of the last file being searched for.

%size%
The size of the last file being searched for.

fileid1
The name and ext of a file to search for. This file is one that if it exists, the application is installed.

date1
The date that the file must have in order to be this version. * or no value means that the date of the file is not important.

time1
The time that the file must have in order to be this version. * or no value means that the time is not important.

size1
The size that the file must have in order to be this version. * or no value means that the size is not important.

fileidn
Used if more than one file is to be checked.

daten
Used if more than one file is to be checked.

timen
Used if more than one file is to be checked.

sizen
Used if more than one file is to be checked.

Obtain Data from Execution of External Application

IPConfig obtains TCP/IP information from the system by executing the WINIPCFG command WINDOWS 95 Operating System or the IPCONFIG command on WINDOWS NT Operating system. Use the IPConfig option to run these utilities and extract information from the result to be sent to the repository.

Syntax:
;IPConfig;output;key;value

Output

This is the output that will be placed in the output file if the key is found. There are several variables that will be substituted into this string before it is returned.

%appid%
  The current application id.

%del%
  The input field delimiter.

%key%
  The Key being searched for.

%value%
  The values found for all occurrences of the key within the app. When there are more than one value the delimiter is used between them.

key
  This is an ASCII string of characters that are searched for at the beginning of each line output by the WINIPCFG or IPCONFIG commands. If found then the remainder of the line, following the : delimiter is used as the value associated with the key being searched for.

value
  If a value is given then the inquiry will succeed only if the value given matches that on the line of the WINIPCFG or IPCONFIG output. When * is the value given or no value is given then the inquiry succeeds if the key is found in the WINIPCFG or IPCONFIG output and the value in that output is returned.

Obtain Data from an ASCII INI File

Often application INI files contain information that is required to determine how that application is installed. Use the INI option to extract information from an application INI file. Those skilled in the art will note that an INI file is an initialization file in Windows which provides persistent storage of configuration data. Many applications employ INI files to store information that must persist. Those skilled in the art of WINDOWS Operating System programming understand the format and use of INI files.

Syntax:
;ini;output;fileid;app;key;value;reg_exe

Output
  This is the output that will be placed in the output file if the key is found. There are several variables that will be substituted into this string before it is returned.

%appid%
  The current application (i.e., group) id.

%del%
  The input field delimiter.

%fileid%
  The full path of the INI file on the system.

%app%
  The application from the INI file.

%key%
  The key from the INI file.

%value%
  The values found for all accuracies of the key within the application are placed here. When there are more than one value the delimiter is used between them.

fileid
  The name and extension of the INI file. A path may also be included but a drive letter is not supported.

app
  The application name within the INI file. This is required and is used to find the application in the file.

key
  This is the key in the INI file. * or no value means that the "n" lines are to be read from the application and placed in the output as a delimited list.

value
  If a value is given then the version is defined by this value assigned to the key. * or no value means that any value assigned to the key is all that is needed. When * is given as the key, then the number of lines to include in the output is given as the value. * or no value in this case means include all lines from the application.

reg_exe (WINDOWS NT/2000/98/95 Operating System Versions)
  This is the name of the registered exe file that will use the INI file being searched. If reg_exe is given then the registered install directory for the executable is first searched for the INI file and then the PATH is searched. When a reg-exe is given the fileid cannot contain a path.

Output a Default String
  Default simply outputs text to the output file if none of the previous options were successful.
  Syntax:
    ;default;output Output
  This is the output that will be placed in the output file. There are several variables that will be substituted into this string before it is returned.

%appid%
  The current application id.

%del%
  The input field delimiter.

Figure 3A:
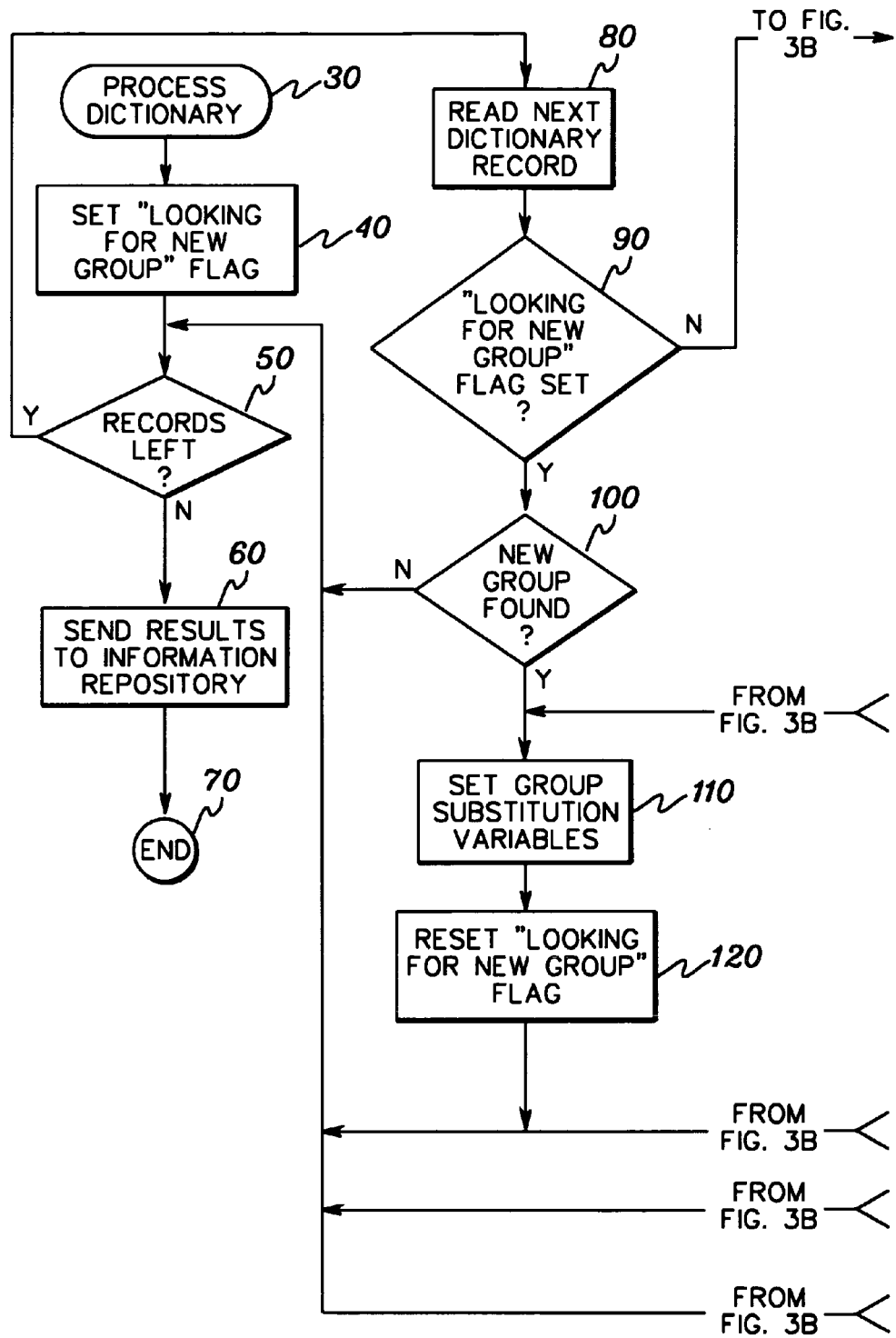
FIGS. 3A & 3B are a flowchart of one embodiment for processing a directory file implemented in accordance with the principles of the present invention.
Figure 3B:
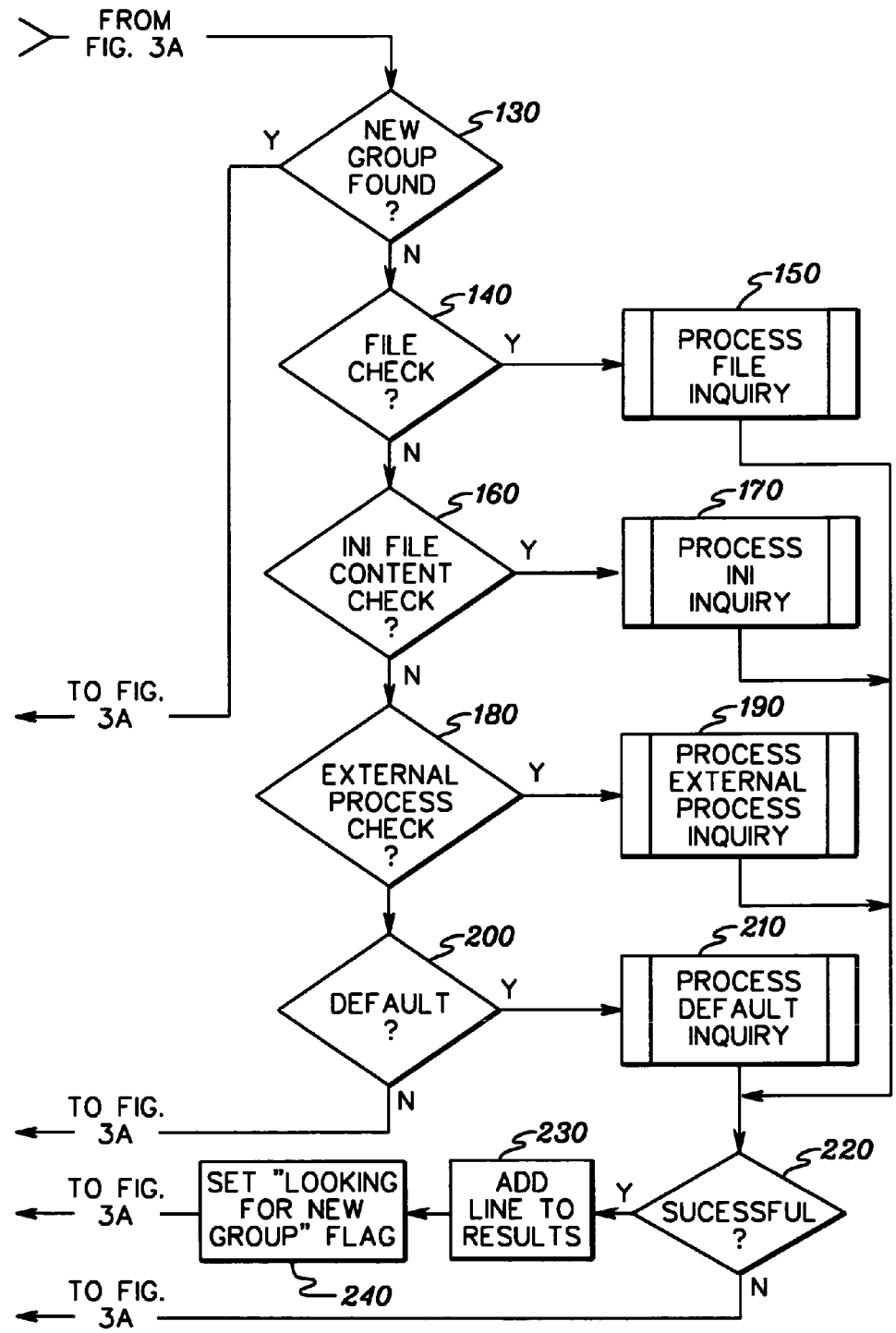

To summarize, there are several search options which could be employed to determine a version or other state information for a computer system, including:
  Searching for a file
  Searching for a certain INI file entry
  Using output of some other external application
  Checking for a default condition, or
  Looking for a registry key/value FIGS. 3A & 3B depict a flowchart of one embodiment for processing a dictionary file data structure in accordance with the principles of the present invention. The data structure in this example employs the first four options noted above. Other examples, however, will be apparent to those skilled in the art.

In the embodiment of FIGS. 3A & 3B, dictionary file processing 30 begins with setting of a "Looking For a New Group" flag 40. As noted above, the dictionary file can be organized into multiple subject groups and the new group flag is set to indicate that the processing is searching for a next group in the file. Next, processing inquiries whether there are any records or lines in the dictionary file left to be processed 50. If "no", then the results obtained up to this point are output in a file to the information repository 60 and processing is terminated 70.

Again, as used herein, a "record" is a line of inquiry which may comprise an "instruction" within the dictionary file. An instruction is a line of inquiry which contains a condition that when satisfied causes a result to be output for inclusion as a line in the file comprising the state information of the computer system under examination. In one example, each record or line of inquiry also comprises an instruction. If records remain, then processing reads a next record from the file 80 and determines whether the "Looking For New Group" flag is set 90. If so, then the new record may comprise the first line of the new group and inquiry determines whether the new group is found 100. If "no", then processing returns to determine whether any records remain in the dictionary file 50. If a new group has been found, then the group substitution variables for the new group are set 110. The group substitution variables could comprise values for the group which are to be inserted into the output with the state information. The "Looking For New Group" flag is then reset 120 and processing determines whether there are any records remaining 50. If so, then at the next pass through inquiry 90 the "Looking For New Group" flag will not be set and processing determines whether a new group is found 130. If a new group is found, this means that the previous group had no lines of inquiry and the group substitution variables are set for the new group 110.

Assuming that the record does not comprise a new group, then processing determines whether the record is a file check inquiry 140. If so, then a process file inquiry subroutine 150 is called. If the record is not a file check inquiry, processing determines whether the record is an INI file content check inquiry 160. If so, then a process INI inquiry subroutine 170 is called. If the answer to inquiry 160 is "no", then processing determines whether the record is an external process check inquiry 180, and if so, a process external process inquiry subroutine 190 is called. Finally, in this example, processing determines whether the record is a default inquiry 200. If so, the process default inquiry subroutine 210 is called. Otherwise, no action is taken and processing determines whether there are any records remaining 50.

FIGS. 4, 5, 6 & 7 respectively depict one embodiment of a process file inquiry subroutine 150, a process INI inquiry subroutine 170, a process external process inquiry subroutine 190, and a process default inquiry subroutine 210. Continuing with FIGS. 3A & 3B, after processing the record through the appropriate subroutine, inquiry is made whether the condition within the record has been satisfied 220. If so, then the result associated with the record is added to a results file to be output upon completion of dictionary file processing 230. The "Look For New Group" flag is then set 240 and processing looks for a next record in the dictionary file 50. If the condition in the record is unsuccessful, then processing directly returns to inquiry 50.

Figure 4:
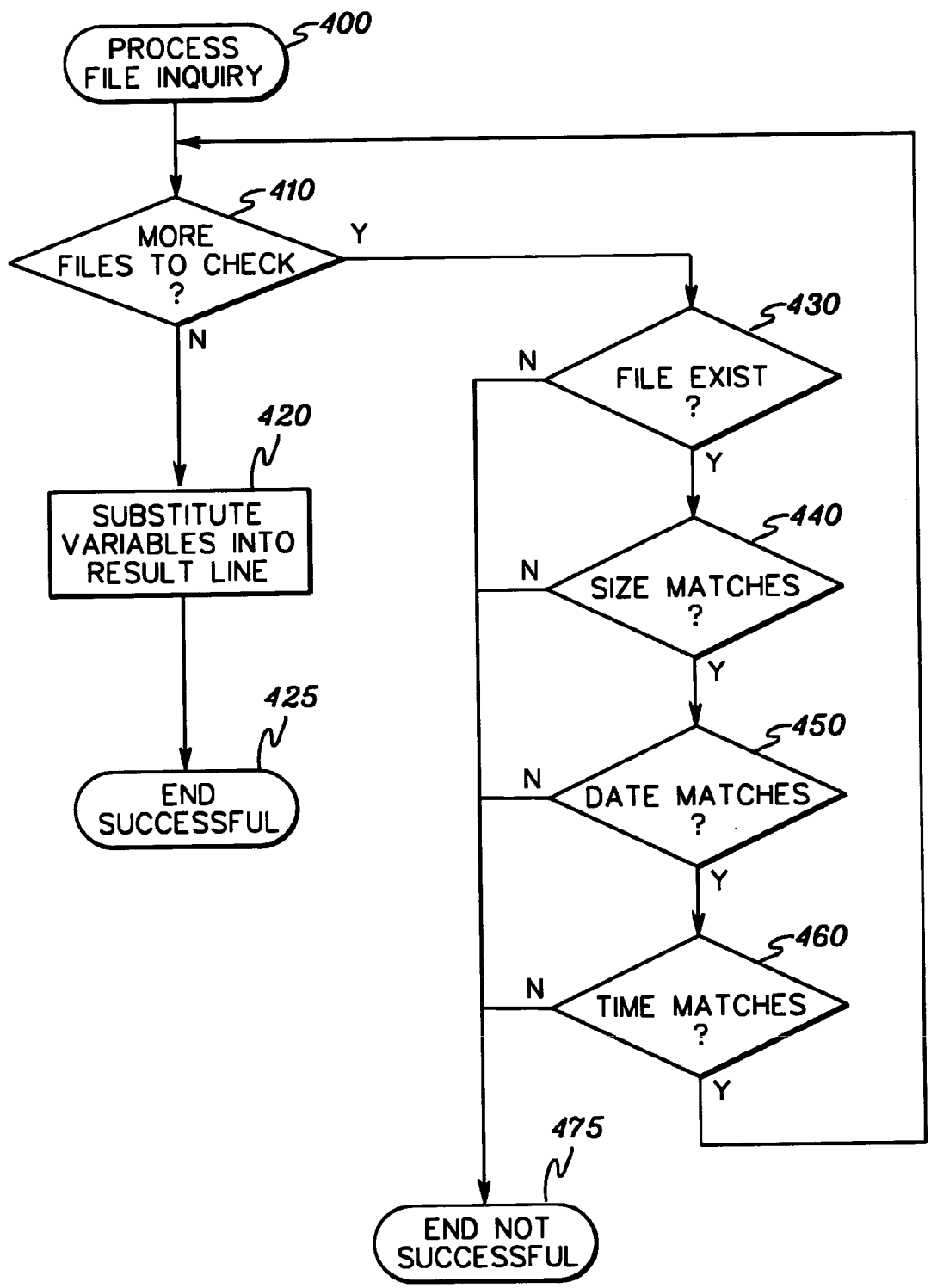
FIG. 4 is a flowchart of one embodiment of a process file inquiry routine called by the directory file process flowchart of FIGS. 3A & 3B.

FIG. 4 depicts one embodiment of a process file inquiry subroutine 400 which begins by checking whether there are more files in the inquiry to check 410. If "no", then the result or variables from the inquiry line are substituted into the result line to be output as the state information (from the processing of FIGS. 3A & 3B). The result line would also include the group substitution variables set during the processing of FIGS. 3A & 3B. This successfully ends processing 425 of the process file inquiry 400. If there are more files to be checked in the inquiry, processing determines whether the desired file exists 430, whether the size of the file matches the anticipated size 440, whether the date of the file matches 450 and whether the time of the file matches 460. If "yes" to these inquiries, then the condition has been satisfied and processing determines whether there are any more files to check. If "no", then the corresponding result of the inquiry is substituted into the result line to be output as the state information for the client and processing successfully terminates 425. If the answer to any of inquiry 430, 440, 450 or 460 is "no", then processing is terminated for the line of inquiry since the condition does not exist on the client 475.

Figure 5:
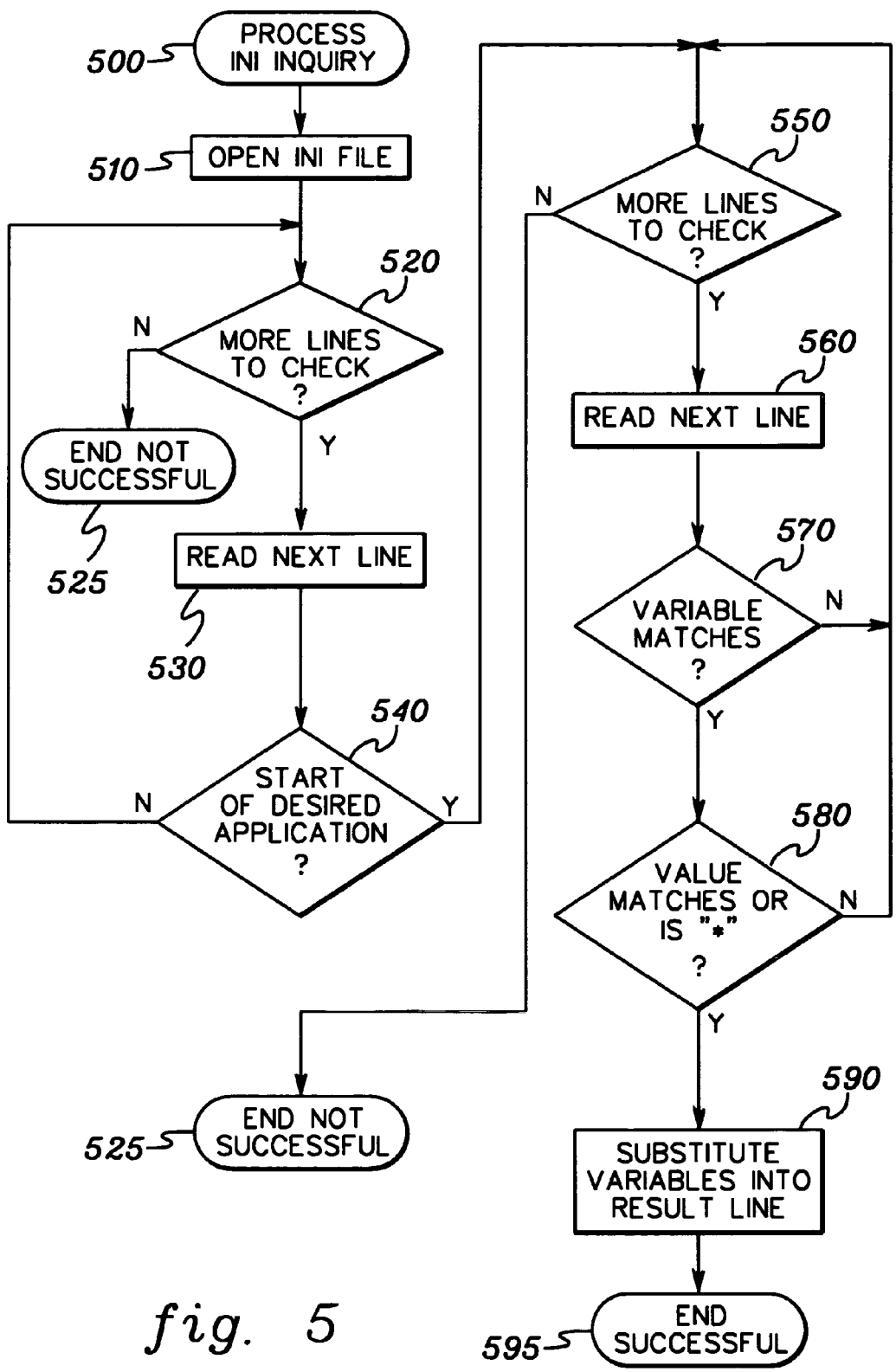
FIG. 5 is a flowchart of one embodiment of a process INI inquiry routine called by the directory file process flowchart of FIGS. 3A & 3B.

FIG. 5 depicts one embodiment of a process INI inquiry routine 500 which begins by opening the INI file 510. Processing determines whether there are more lines to check in the INI file 520. If "no", then the process INI inquiry was not successful 525. Otherwise, the next line of the INI file is read 530 and processing determines whether the line is the start of a desired application or section in the INI file 540. If "no", then a next line in the INI file is checked and the process is repeated until the start of the desired application in the INI file is found.

Once the start of the desired application is found, processing determines whether there are more lines in the INI file to check 550. If not, then the process INI inquiry has been unsuccessful 525. If so, the next line is read 560 and processing determines whether the variable matches 570. If "no", then a next line is checked 550. Otherwise, processing inquires whether the value of the variable matches or is a don't care 580. If "no", then a next line is checked. If the value matches or is a don't care, then the variables are substituted into the result line to be output as a portion of the state information 590 and the process INI inquiry is successfully ended 595.

Figures 6, 7:
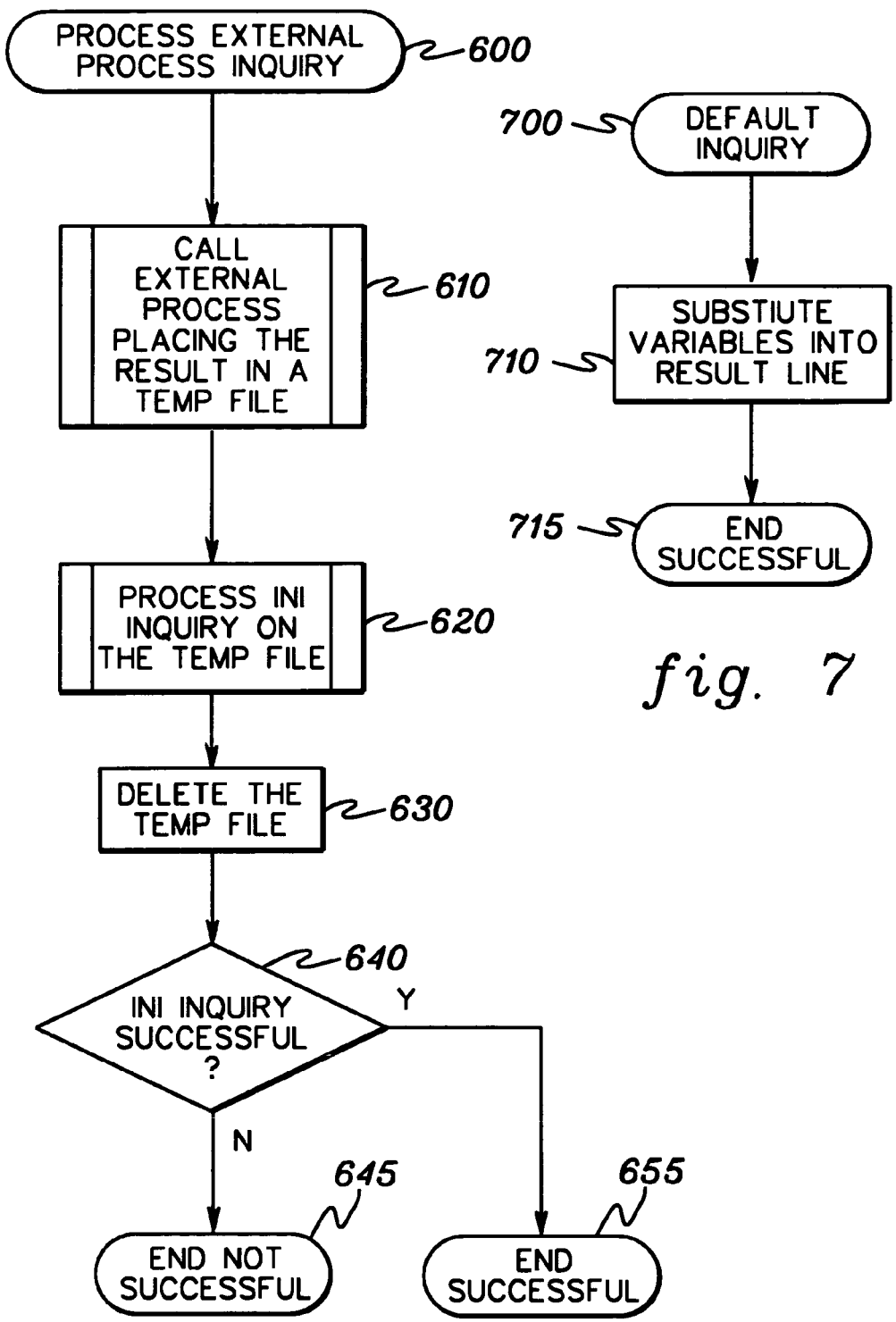
FIG. 6 is a flowchart of one embodiment of a process external process inquiry routine called by the dictionary file process of FIGS. 3A & 3B.
FIG. 7 is a flowchart of one embodiment of a default routine called by the directory process flowchart of FIGS. 3A & 3B.

FIG. 6 depicts one embodiment of a process external process inquiry 600 which calls the external process and places the result in a temporary file 610. As noted above, there are a number of options with respect to processing of an external application. The external application could output an INI file, an ASCII file, or registry changes. In this example, an INI file output is assumed. Thus, an INI inquiry is processed on the temporary file 620 to determine whether the condition has been successfully met. The temporary file is then deleted 630 and processing determines whether the INI inquiry was successful 640. If so, an end successful result 655 is obtained, otherwise an end not successful result is output 645.

FIG. 7 is a flowchart for processing a default inquiry 700. This processing simply comprises substituting variables into the result line 710 as defined by the default inquiry. Processing is always successful 715 with a default inquiry.

FIG. 8 depicts an example dictionary file wherein an external process IPCconfig is called and the results of that external process are compared with a predefined condition. This example dictionary file is described in greater detail in the above-incorporated, co-filed patent application.

Those skilled in the art will note from the above description that presented herein is an information gathering facility which employs a dictionary file data structure at a central location to derive state information on one or more computer systems in a network. Advantageously, the format of the state information returned can be defined by results contained within the dictionary file data structure itself. The data structure comprises a plurality of inquiries which are organized into subject groups and when a particular condition of an inquiry is satisfied, all other inquiries in the group are skipped. As new versions of an application on one or more computer systems in the network become available, a new inquiry is simply added to the respective group that is looking for that application.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for gathering information on a state of a network of computer systems, said method comprising:
   providing at a central location a dictionary file data structure having a plurality of unique inquiries for ascertaining state information on at least one computer system of said network of computer systems, said plurality of unique inquiries being organized into at least one subject group, each subject group being directed to a different piece of said state information, at least one group of said at least one subject group having multiple unique records of inquiry; and
   processing said at least one subject group of said dictionary file data structure to accumulate said state information, said processing comprising for each group of said at least one group having multiple unique records of inquiry:
   processing a record of said multiple unique records of inquiry, and if a condition of said record is satisfied then terminating processing of said group, otherwise processing a next record of said multiple unique records of inquiry and continuing until a condition of one record of said multiple records of inquiry is satisfied or all records of said multiple records of inquiry of said group have been processed.

2. The method of claim 1, wherein said at least one subject group comprises multiple subject groups, and wherein said processing of each group of said at least one group having multiple records of inquiry comprises proceeding to a next group of said multiple subject groups when said condition of one record of said multiple records of inquiry in said at least one group is satisfied.

3. The method of claim 1, wherein multiple inquiries of said plurality of inquiries comprise instructions, each instruction providing a result when a condition of said instruction is satisfied.

4. The method of claim 3, further comprising collecting results of said instructions into a file, said file being representative of said state of said computer system.

5. The method of claim 4, wherein each inquiry of said plurality of inquiries is an instruction which provides a result when a condition of said instruction is satisfied.

6. The method of claim 4, wherein said processing comprises processing each group of said at least one subject group, and wherein said method further comprises transferring said file to an information repository coupled to said computer system across a network.

7. The method of claim 6, wherein said computer system comprises one computer system of a plurality of computer systems coupled to said network.

8. The method of claim 1, wherein said dictionary file comprises a rules database in an ASCII file.

9. The method of claim 1, wherein at least one record of inquiry of said multiple records of inquiry comprises an instruction which provides a result when a condition of said instruction is satisfied, said result comprising state information for said group having said record when the condition of said instruction is satisfied.

10. The method of claim 1, wherein said computer system comprises one computer system within a network of computer systems, and wherein said providing comprises reading said dictionary file from a server coupled to said network of computer systems to said one computer system to gather said state information thereon.

11. The method of claim 10, further comprising forwarding results representative of gathered state information to an information repository coupled to said network of computer systems, said information repository residing at said server system providing said dictionary file.

12. The method of claim 1, wherein said processing comprises processing each group of said at least one subject group, and setting group substitution variables for output upon initiation of processing of each group of said at least one subject group.

13. The method of claim 1, wherein said multiple records of inquiry of said at least one group comprise at least one of a file check inquiry, a file content check inquiry, an external process check inquiry, or a default inquiry for said group.

14. The method of claim 1, wherein said plurality of inquiries comprise multiple inquiry types, and wherein said multiple inquiry types comprise at least two of:
   a file inquiry which checks for existence of a file of a certain date, time or size and which can return file information;
   an INI file inquiry which checks for a certain application, variable and value, and which can return a certain value or one or more variables and values;
   an ASCII file inquiry which checks for a certain character string in a file, and which can return information on a line within the character string;
   a registry inquiry which checks for a certain registry tree or value, and which can return one or more values in a tree or sub-tree;
   an external process inquiry using an INI output, which comprises executing an external process and performing an INI file inquiry on the result;
   an external process inquiry which executes an external process, provides an ASCII output, and performs an ASCII file inquiry on the result;
   an external process inquiry using a registry, which executes an external process and performs a registry inquiry on the result; and
   multiple inquiries which comprise a combination of multiple other inquiry types, where all must succeed.

15. A method for gathering information on a state of a network of computer systems, said method comprising:
   providing at a central location a dictionary file data structure having a plurality of unique inquiries for ascertaining said state information on at least one computer system of said network of computer systems, at least one inquiry of said plurality of unique inquiries within the dictionary file data structure comprising an instruction having a result which is automatically output when a condition of said instruction is satisfied, each result being predefined in said dictionary file data structure, and wherein said plurality of inquiries comprise at least one of a file check inquiry, a file content check inquiry, an external process check inquiry, or a default inquiry; and processing at least one inquiry of said plurality of inquiries of said dictionary file to accumulate said state information, said processing comprising for each instruction processed, outputting said result of said instruction from said dictionary file data structure when said condition of said instruction is satisfied, wherein said state information on said at least one computer system comprises outputted results from said dictionary file data structure from satisfaction of said at least one instruction.

16. The method of claim 15, wherein said at least one inquiry comprising said instruction comprises multiple inquiries of said plurality of inquiries, each instruction having a result which is output when a condition of said instruction is satisfied.

17. The method of claim 16, further comprising collecting results of said instructions into a file, said file being representative of said state of the computer system.

18. The method of claim 17, wherein each inquiry of said plurality of inquiries is an instruction which provides a result when a condition of said instruction is satisfied.

19. The method of claim 17, further comprising transferring said file to an information repository coupled to said computer system across a network.

20. The method of claim 19, wherein said computer system comprises one computer system of a plurality of computer systems coupled to said network.

21. The method of claim 15, wherein said dictionary file comprises a rules database defined in an ASCII file.

22. The method of claim 15, wherein said computer system comprises one computer system within a network of computer systems, and wherein said providing comprises reading said dictionary file from a server coupled to said network to said one computer system to gather said state information thereon.

23. The method of claim 22, wherein said reading of said dictionary file is performed by an inquiry tool routine located on said one computer system.

24. The method of claim 22, further comprising forwarding results representative of gathered state information to an information repository of said network of computer systems, said information repository residing at said server providing said dictionary file.

25. The method of claim 15, wherein said plurality of inquiries comprise multiple inquiry types, and wherein said multiple inquiry types comprise at least two of:
 a file inquiry which checks for existence of a file of a certain date, time or size and which can return file information;
 an INI file inquiry which checks for a certain application, variable and value, and which can return a certain value, or one or more variables and values;
 an ASCII file inquiry which checks for a certain character string in a file, and which can return information on a line within the character string;
 a registry inquiry which checks for a certain registry tree or value, and which can return one or more values in a tree or sub-tree;
 an external process inquiry using an INI output, which comprises executing an external process and performing an INI file inquiry on the result;
 an external process inquiry which executes an external process, provides an ASCII output, and performs an ASCII file inquiry on the result;
 an external process inquiry using a registry, which executes an external process and performs a registry inquiry on the result; and
 multiple inquiries which comprise a combination of multiple other inquiry types, where all must succeed.

26. The method of claim 15, wherein said plurality of inquiries are organized into at least one subject group, each subject group being directed to a different piece of said state information, at least one group of the at least one subject group having multiple instructions, and processing each instruction of each group of the at least one group having multiple instructions such that if a condition of the instruction is satisfied then terminating processing of the group, otherwise processing a next instruction of the multiple instructions within the group and continuing until a condition of one instruction of the multiple instructions is satisfied or until all instructions of the multiple instructions of the group have been processed.

27. A memory for centrally storing a dictionary file data structure, the dictionary file data structure facilitating gathering of information on a state of a network of computer systems, the dictionary file data structure comprising:
 a plurality of unique inquiries for ascertaining state information on at least one computer system of said network of computer systems, said plurality of unique inquiries being organized into at least one subject group, each subject group being directed to a different piece of said state information, at least one group of the at least one subject group having multiple unique records of inquiry; and
 wherein the multiple unique records of inquiry of the at least one group comprise multiple instructions, each instruction comprising a result to be automatically output when a condition of said instruction is satisfied, each result being predefined in said dictionary file data structure, and wherein outputting of a result from one instruction terminates processing of said at least one group having multiple records of inquiry.

28. A memory for centrally storing a dictionary file data structure, the dictionary file data structure facilitating gathering information on a state of a network of computer systems, the dictionary file data structure comprising:
 a plurality of unique inquiries for ascertaining said state information on at least one computer system of said network of computer systems, at least one inquiry of the plurality of unique inquiries comprising an instruction having a result which is automatically output when a condition of said instruction is satisfied, each result being predefined in said dictionary file data structure, and wherein said plurality of unique inquiries comprise at least one of a file check inquiry, a file content check inquiry, an external process check inquiry, or a default inquiry.

29. A system for gathering information on a state of a network of computer systems, said system comprising:
 means for providing at a central location a dictionary file data structure having a plurality of unique inquiries for ascertaining state information on at least one computer system of said network of computer systems, said plurality of unique inquiries being organized into at least one subject group, each subject group being directed to a different piece of said state information, at least one group of said at least one subject group having multiple unique records of inquiry; and
 means for processing at least one inquiry of said plurality of inquiries of said dictionary file to accumulate said state information, said means for processing comprises for each group of said at least one group having multiple unique records of inquiry:
means for processing a record of said multiple unique records of inquiry, and if a condition of said record is satisfied then for terminating processing of said group, otherwise for processing a next record of said multiple records of inquiry and continuing until a condition of one record of said multiple unique records of inquiry is satisfied or all records of said multiple records of inquiry of said group have been processed.

30. The system of claim 29, wherein said at least one subject group comprises multiple subject groups, and wherein said means for processing of each group of said at least one group having multiple records of inquiry comprises means for proceeding to a next group of said multiple subject groups when said condition of one record of said multiple records of inquiry in said at least one group is satisfied.

31. The system of claim 29, wherein at least some inquiries of said plurality of inquiries comprise instructions, each instruction providing a result when a condition of said instruction is satisfied.

32. The system of claim 31, further comprising means for collecting results of said instructions into a file, said file being representative of said state of said computer system.

33. The system of claim 32, wherein each inquiry of said plurality of inquiries is an instruction which provides a result when a condition of said instruction is satisfied.

34. The system of claim 32, wherein said means for processing comprises means for processing each group of said at least one subject group, and wherein said system further comprises means for transferring said file to an information repository coupled to said computer system across a network.

35. The system of claim 34, wherein said computer system comprises one computer system of a plurality of computer systems coupled to said network.

36. The system of claim 29, wherein said dictionary file comprises a rules database in an ASCII file.

37. The system of claim 29, wherein said means for processing comprises means for processing each group of said at least one subject group, and means for setting group substitution variables for output upon initiation of processing of each group of said at least one subject group.

38. The system of claim 29, wherein said multiple records of inquiry of said at least one group comprise at least one of a file check inquiry, a file content check inquiry, an external process check inquiry, or a default inquiry for said group.

39. The system of claim 29, wherein said plurality of inquiries comprise multiple inquiry types, and wherein said multiple inquiry types comprise at least two of:
a file inquiry which checks for existence of a file of a certain date, time or size and which can return file information;
an INI file inquiry which checks for a certain application, variable and value, and which can return a certain value or one or more variables and values;
an ASCII file inquiry which checks for a certain character string in a file, and which can return information on a line within the character string;
a registry inquiry which checks for a certain registry tree or value, and which can return one or more values in a tree or sub-tree;
an external process inquiry using an INI output, which comprises executing an external process and performing an INI file inquiry on the result;
an external process inquiry which executes an external process, provides an ASCII output, and performs an ASCII file inquiry on the result;
an external process inquiry using a registry, which executes an external process and performs a registry inquiry on the result; and
multiple inquiries which comprise a combination of multiple other inquiry types, where all must succeed.

40. A system for gathering information on a state of a network of computer systems, said system comprising:
means for providing at a central location a dictionary file data structure having a plurality of unique inquiries for ascertaining said state information on at least one computer system of said network of computer systems, at least one inquiry of said plurality of unique inquiries within the dictionary file data structure comprising an instruction having a result which is automatically output when a condition of said instruction is satisfied, each result being predefined in said dictionary file data structure, and wherein said plurality of inquiries comprise at least one of a file check inquiry, a file content check inquiry, an external process check inquiry, or a default inquiry; and
means for processing said at least one inquiry of said plurality of inquiries of said dictionary file to accumulate said state information, said means for processing comprising for each instruction processed, means for outputting said result of said instruction from said dictionary file data structure when said condition of said instruction is satisfied, wherein said state information on said at least one computer system comprises any outputted results from said dictionary file data structure from satisfaction of said at least one instruction.

41. The system of claim 40, wherein said at least one inquiry comprising said instruction comprises multiple inquiries of said plurality of inquiries, each instruction having a result which is output when a condition of said instruction is satisfied.

42. The system of claim 41, further comprising means for collecting results of said instructions into a file, said file being representative of said state of the computer system.

43. The system of claim 42, wherein each inquiry of said plurality of inquiries is an instruction which provides a result when a condition of said instruction is satisfied.

44. The system of claim 42, further comprising means for transferring said file to an information repository coupled to said computer system across a network.

45. The system of claim 44, wherein said computer system comprises one computer system of a plurality of computer systems coupled to said network.

46. The system of claim 40, wherein said dictionary file comprises a rules database defined in an ASCII file.

47. The system of claim 40, wherein said plurality of inquiries comprise multiple inquiry types, and wherein said multiple inquiry types comprise at least two of:
a file inquiry which checks for existence of a file of a certain date, time or size and which can return file information;
an INI file inquiry which checks for a certain application, variable and value, and which can return a certain value, or one or more variables and values;
an ASCII file inquiry which checks for a certain character string in a file, and which can return information on a line within the character string;

a registry inquiry which checks for a certain registry tree or value, and which can return one or more values in a tree or sub-tree;

an external process inquiry using an INI output, which comprises executing an external process and performing an INI file inquiry on the result;

an external process inquiry which executes an external process, provides an ASCII output, and performs an ASCII file inquiry on the result;

an external process inquiry using a registry, which executes an external process and performs a registry inquiry on the result; and multiple inquiries which comprise a combination of multiple other inquiry types, where all must succeed.

48. The system of claim 40, wherein said plurality of inquiries are organized into at least one subject group, each subject group being directed to a different piece of said state information, at least one group of the at least one subject group having multiple instructions, and said system comprising means for processing each instruction of each group of the at least one group having multiple instructions such that if a condition of the instruction is satisfied processing of the group is terminated, otherwise a next instruction of the multiple instructions within the group is processed and continuing until a condition of one instruction of the multiple instructions is satisfied or until all instructions of the multiple instructions of the group have been processed.

49. At least one program storage device readable by a machine, tangibly embodying at least one program of instructions executable by the machine to perform a method for gathering information on a state of a network of computer systems, said method comprising:

providing at a central location a dictionary file data structure having a plurality of unique inquiries for ascertaining state information on at least one computer system of said network of computer systems, said plurality of unique inquiries being organized into at least one subject group, each subject group being directed to a different piece of said state information, at least one group of said at least one subject group having multiple unique records of inquiry; and processing at least one inquiry of said plurality of inquiries of said dictionary file to accumulate said state information, said processing comprising for each group of said at least one group having multiple unique records of inquiry:

processing a record of said multiple unique records of inquiry, and if a condition of said record is satisfied then terminating processing of said group, otherwise processing a next record of said multiple unique records of inquiry and continuing until a condition of one record of said multiple records of inquiry is satisfied or all records of said multiple records of inquiry of said group have been processed.

50. The at least one program storage device of claim 49, wherein said at least one subject group comprises multiple subject groups, and wherein said processing of each group of said at least one group having multiple records of inquiry comprises proceeding to a next group of said multiple subject groups when said condition of one record of said multiple records of inquiry in said at least one group is satisfied.

51. The at least one program storage device of claim 49, wherein at least some inquiries of said plurality of inquiries comprise instructions, each instruction providing a result when a condition of said instruction is satisfied.

52. The at least one program storage device of claim 51, further comprising collecting results of said instructions into a file, said file being representative of said state of said computer system.

53. The at least one program storage device of claim 52, wherein each inquiry of said plurality of inquiries is an instruction which provides a result when a condition of said instruction is satisfied.

54. The at least one program storage device of claim 52, wherein said processing comprises processing each group of said at least one subject group, and wherein said method further comprises transferring said file to an information repository coupled to said computer system across a network.

55. The at least one program storage device of claim 54, wherein said computer system comprises one computer system of a plurality of computer systems coupled to said network.

56. The at least one program storage device of claim 49, wherein said dictionary file comprises a rules database in an ASCII file.

57. The at least one program storage device of claim 49, wherein said multiple records of inquiry of said at least one group comprise at least one of a file check inquiry, a file content check inquiry, an external process check inquiry, or a default inquiry for said group.

58. The at least one program storage device of claim 49, wherein said plurality of inquiries comprise multiple inquiry types, and wherein said multiple inquiry types comprise at least two of:

a file inquiry which checks for existence of a file of a certain date, time or size and which can return file information;

an INI file inquiry which checks for a certain application, variable and value, and which can return a certain value or one or more variables and values;

an ASCII file inquiry which checks for a certain character string in a file, and which can return information on a line within the character string;

a registry inquiry which checks for a certain registry tree or value, and which can return one or more values in a tree or sub-tree;

an external process inquiry using an INI output, which comprises executing an external process and performing an INI file inquiry on the result;

an external process inquiry which executes an external process, provides an ASCII output, and performs an ASCII file inquiry on the result;

an external process inquiry using a registry, which executes an external process and performs a registry inquiry on the result; and multiple inquiries which comprise a combination of multiple other inquiry types, where all must succeed.

59. At least one program storage device readable by a machine, tangibly embodying at least one program of instructions executable by the machine to perform a method for gathering information on a state of a network of computer systems, said method comprising:

providing at a central location a dictionary file data structure having a plurality of unique inquiries for ascertaining said state information on at least one computer system of said network of computer systems, at least one inquiry of said plurality of unique inquiries within the dictionary file data structure comprising an instruction having a result which is automatically output when a condition of said instruction is satisfied, each result being predefined in said dictionary file data structure, and wherein said plurality of inquiries comprise at least one of a file check inquiry, a file content check inquiry, an external process check inquiry, or a default inquiry; and processing at least one inquiry of said plurality of inquiries of said dictionary file to accumulate said state information, said processing comprising for each instruction processed, outputting said result of said instruction from said dictionary file data structure when said condition of said instruction is satisfied, wherein said state information on said at least one computer system comprises outputted results from said dictionary file data structure from satisfaction of said at least one instruction.

60. The at least one program storage device of claim 59, wherein said at least one inquiry comprising said instruction comprises multiple inquiries of said plurality of inquiries, each instruction having a result which is output when a condition of said instruction is satisfied.

61. The at least one program storage device of claim 60, further comprising collecting results of said instructions into a file, said file being representative of said state of the computer system.

62. The at least one program storage device of claim 61, wherein each inquiry of said plurality of inquiries is an instruction which provides a result when a condition of said instruction is satisfied.

63. The at least one program storage device of claim 61, further comprising transferring said file to an information repository coupled to said computer system across a network.

64. The at least one program storage device of claim 63, wherein said computer system comprises one computer system of a plurality of computer systems coupled to said network.

65. The at least one program storage device of claim 59, wherein said dictionary file comprises a rules database defined in an ASCII file.

66. The at least one program storage device of claim 59, wherein said plurality of inquiries comprise multiple inquiry types, and wherein said multiple inquiry types comprise at least two of:

a file inquiry which checks for existence of a file of a certain date, time or size and which can return file information;

an INI file inquiry which checks for a certain application, variable and value, and which can return a certain value, or one or more variables and values;

an ASCII file inquiry which checks for a certain character string in a file, and which can return information on a line within the character string;

a registry inquiry which checks for a certain registry tree or value, and which can return one or more values in a tree or sub-tree;

an external process inquiry using an INI output, which comprises executing an external process and performing an INI file inquiry on the result;

an external process inquiry which executes an external process, provides an ASCII output, and performs an ASCII file inquiry on the result;

an external process inquiry using a registry, which executes an external process and performs a registry inquiry on the result; and multiple inquiries which comprise a combination of multiple other inquiry types, where all must succeed.

67. The at least one program storage device of claim 59, wherein said plurality of inquiries are organized into at least one subject group, each subject group being directed to a different piece of said state information, at least one group of the at least one subject group having multiple instructions, and processing each instruction of each group of the at least one group having multiple instructions such that if a condition of the instruction is satisfied then terminating processing of the group, otherwise processing a next instruction of the multiple instructions within the group and continuing until a condition of one instruction of the multiple instructions is satisfied or until all instructions of the multiple instructions of the group have been processed.

* * * * *

UNITED STATES PATENT AND TRADEMARK OFFICE
CERTIFICATE OF CORRECTION

PATENT NO. : 6,999,973 B1
DATED : February 14, 2006
INVENTOR(S) : Murray

It is certified that error appears in the above-identified patent and that said Letters Patent is hereby corrected as shown below:

Title page,
Item [54], Title, delete "INQUIRES" and insert -- INQUIRIES --.

Column 5,
Line 44, delete "fileid%" and insert -- %fileid% --.

Signed and Sealed this

Twenty-fifth Day of April, 2006

JON W. DUDAS
*Director of the United States Patent and Trademark Office*